(12) United States Patent
Guevel et al.

(10) Patent No.: US 9,019,796 B2
(45) Date of Patent: Apr. 28, 2015

(54) STREAMER SPREAD WITH REDUCED DRAG

(71) Applicant: CGG Services SA, Massy Cedex (FR)

(72) Inventors: Christophe Guevel, Massy (FR); Pierre Le Roux, Massy (FR); Raphaël Macquin, Montrouge (FR); Jean-Pierre Degez, Massy (FR)

(73) Assignee: CGG Services SA, Massy Cedex (FR)

( * ) Notice: Subject to any disclaimer, the term of this patent is extended or adjusted under 35 U.S.C. 154(b) by 35 days.

(21) Appl. No.: 13/976,765

(22) PCT Filed: Feb. 6, 2013

(86) PCT No.: PCT/EP2013/052332
§ 371 (c)(1),
(2) Date: Jun. 27, 2013

(87) PCT Pub. No.: WO2013/117593
PCT Pub. Date: Aug. 15, 2013

(65) Prior Publication Data
US 2014/0078862 A1 Mar. 20, 2014

Related U.S. Application Data

(60) Provisional application No. 61/595,798, filed on Feb. 7, 2012.

(51) Int. Cl.
G01V 1/38 (2006.01)
B63B 21/66 (2006.01)

(52) U.S. Cl.
CPC . *G01V 1/38* (2013.01); *B63B 21/66* (2013.01); *G01V 1/3817* (2013.01); *G01V 1/3826* (2013.01); *G01V 1/3843* (2013.01)

(58) Field of Classification Search
CPC ........................................................ G01V 1/38
USPC ............................................................ 367/20
See application file for complete search history.

(56) References Cited

U.S. PATENT DOCUMENTS 2,729,300 A * 1/1956 Paslay et al. .................. 181/110
5,673,644 A 10/1997 Vanasse et al.
5,835,450 A 11/1998 Russell
(Continued)

FOREIGN PATENT DOCUMENTS

EP 2322424 A1 5/2011

OTHER PUBLICATIONS

International Search Report mailed May 23, 2013 in corresponding PCT/EP2013/052332.
(Continued)

*Primary Examiner* — Ari M Diacou
(74) *Attorney, Agent, or Firm* — Patent Portfolio Builders PLLC

(57) ABSTRACT

A method and a marine front-end gear for connecting a set of streamers to a towing vessel. The front-end gear includes ropes for connecting a first sub-set of streamers to the vessel; lead-ins for connecting a second sub-set of streamers to the vessel; and a back loop cable electrically connected between tails of first and second adjacent streamers. The first streamer belongs to the first sub-set of streamers and the second streamer belongs to the second sub-set of streamers, and streamers of the first sub-set are interspersed with streamers of the second sub-set.

20 Claims, 7 Drawing Sheets

(56) References Cited

U.S. PATENT DOCUMENTS

| | | | |
|---|---|---|---|
| 5,913,280 A * | 6/1999 | Nielsen et al. | 114/242 |
| 6,108,267 A * | 8/2000 | Pearce | 367/20 |
| 6,498,768 B1 | 12/2002 | Gjestrum et al. | |
| 6,837,175 B1 | 1/2005 | Gieseke | |
| 7,184,365 B2 | 2/2007 | George et al. | |
| 7,221,620 B2 | 5/2007 | Planke et al. | |
| 2004/0125698 A1 * | 7/2004 | George et al. | 367/20 |
| 2005/0016434 A1 * | 1/2005 | Hocquet et al. | 114/250 |
| 2005/0279268 A1 * | 12/2005 | Storteig et al. | 114/274 |
| 2006/0215489 A1 * | 9/2006 | Solheim et al. | 367/20 |
| 2006/0256654 A1 * | 11/2006 | Paulsen | 367/20 |
| 2007/0223306 A1 * | 9/2007 | Toennessen | 367/15 |
| 2008/0008037 A1 * | 1/2008 | Welker | 367/21 |
| 2008/0175097 A1 * | 7/2008 | Storteig et al. | 367/16 |
| 2010/0149910 A1 * | 6/2010 | Martin | 367/17 |
| 2010/0170428 A1 | 7/2010 | Toennessen | |
| 2010/0254216 A1 * | 10/2010 | Toennessen | 367/20 |
| 2012/0300581 A1 * | 11/2012 | Vahida | 367/16 |

OTHER PUBLICATIONS

Written Opinion of the ISA mailed May 23, 2013 in corresponding PCT/EP2013/052332.

* cited by examiner

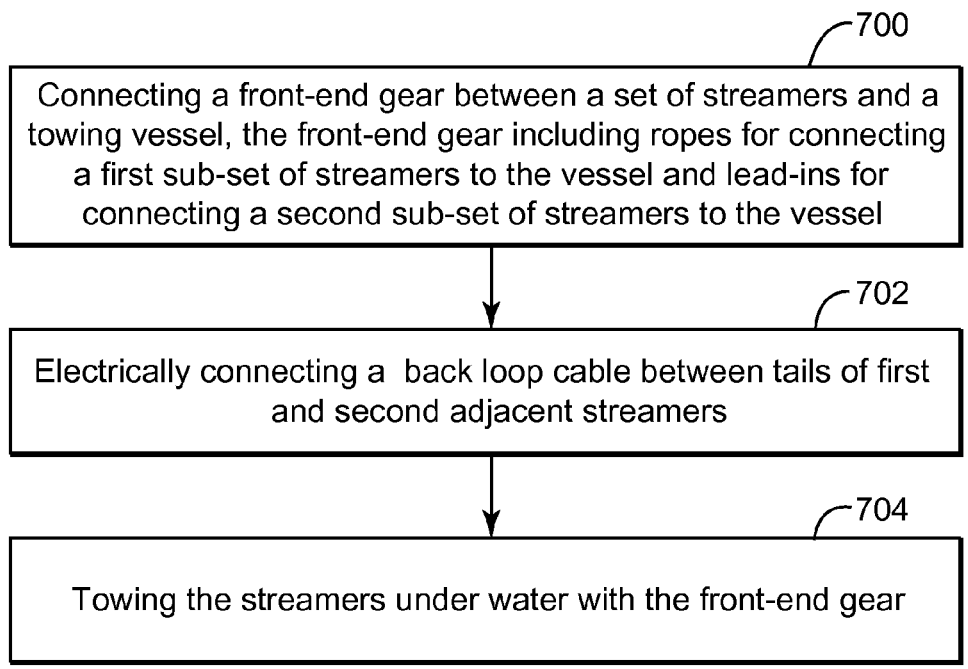

STREAMER SPREAD WITH REDUCED DRAG

BACKGROUND

1. Technical Field

Embodiments of the subject matter disclosed herein generally relate to methods and systems and, more particularly, to mechanisms and techniques for reducing drag produced by a streamer spread when used with a seismic acquisition system.

2. Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of the geophysical structures under the seafloor is an ongoing process.

Reflection seismology is a method of geophysical exploration to determine the properties of earth's subsurface, which is especially helpful in the oil and gas industry. Marine reflection seismology is based on using a controlled source of energy that sends the energy into the earth. By measuring the time it takes for reflections to come back to plural receivers, it is possible to evaluate the depth of features causing such reflections. These features may be associated with subterranean hydrocarbon deposits.

A traditional system for generating seismic waves and recording their reflections off geological structures present in the subsurface is illustrated in FIG. 1. A vessel 10 tows an array of seismic receivers 11 provided on streamers 12. The streamers 12 are attached to the vessel 10 with a front-end gear 13. The streamers may be disposed horizontally, i.e., lying at a constant depth relative to the ocean surface 14, or they may have other than horizontal spatial arrangements. The vessel 10 also tows a seismic source array 16 configured to generate a seismic wave 18. The seismic wave 18 propagates downward and penetrates the seafloor 20 until eventually a reflecting structure 22 (reflector) reflects the seismic wave. The reflected seismic wave 24 propagates upward until it is detected by the receiver 11 on the streamer 12. Based on analyses of the data collected by the receiver 11, an image of the subsurface is generated.

A top view of half of the front-end gear 13 is illustrated in FIG. 2. As noted above, the front-end gear 13 connects plural streamers 12 to the vessel 10. The front-end gear 13 includes at least a wide-tow rope 30 for connecting a deflector 32 to the vessel 10. Another wide-tow rope (not shown) connects another deflector (not shown) to the vessel, and the two deflectors sandwich the heads of the streamers 12. The deflectors are configured to apply tension between the streamer heads so that the separation ropes 34 between the streamers are stretched and, thus, the cross-line distance between adjacent streamers is maintained constant.

Further, the front-end gear 13 includes lead-ins 401 connecting the head of each streamer to the vessel. While the wide-tow rope may be a rope, i.e., may not include any cable for transmitting electric power and/or data, the lead-ins include wires or cables with capabilities to transmit electric power from the vessel to the streamers, and data from the streamers to the vessel. Thus, the lead-ins are heavier than the wide-tow rope and produce considerable drag, especially those lead-ins connecting to the streamers farther away from the traveling direction 44. In this respect, FIG. 2 shows that lead-ins 40A-C make a much larger angle with the traveling direction 44 than lead-ins 401, consequently resulting in greater drag.

Thus, it is desirable to have a front-end gear with decreased drag produced by the lead-ins farthest away from the vessel's traveling direction.

SUMMARY

According to an exemplary embodiment, there is a front-end gear for connecting a set of streamers to a towing vessel. The front-end gear includes ropes for connecting a first sub-set of streamers to the vessel; lead-ins for connecting a second sub-set of streamers to the vessel; and a back loop cable electrically connected between tails of first and second adjacent streamers. The first streamer belongs to the first sub-set of streamers and the second streamer belongs to the second sub-set of streamers.

According to another exemplary embodiment, there is a seismic survey system for acquiring seismic data. The system includes a towing vessel; a front-end gear connected to the vessel; and plural streamers connected to the front-end gear and configured to collect the seismic data. Tails of a pair of streamers are electrically connected to each other with a back loop cable.

According to still another exemplary embodiment, there is a method for towing plural streamers during a marine seismic acquisition survey. The method includes a step of connecting a front-end gear between a set of streamers and a towing vessel, the front-end gear including ropes for connecting a first sub-set of streamers to the vessel and lead-ins for connecting a second sub-set of streamers to the vessel; a step of electrically connecting a back loop cable between tails of first and second adjacent streamers; and a step of towing the streamers under water with the front-end gear. The first streamer belongs to the first sub-set of streamers and the second streamer belongs to the second sub-set of streamers, and streamers of the first sub-set are interspersed with streamers of the second sub-set.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 7 is a flowchart of a method for towing a front-end gear according to an exemplary embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a marine seismic acquisition system having part of the lead-ins replaced by ropes. However, the embodiments to be discussed next are not limited to this configuration.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

New technologies in marine seismic surveys need a front-end gear that produces less drag on the vessel while providing necessary electric power and data transmission functions. Reducing drag is an important objective for modern seismic surveys because of the trend to increase the number of streamers. While traditional seismic survey systems in the past have used between one and six streamers, the most modern survey systems are using 16 or more streamers. This increase in the number of streamers increases drag, and thus, the power needed by the towing vessel. Further, streamers are becoming longer, for example, up to 20 km. Such a large spread requires a great amount of power for being towed underwater. One solution to this problem is to increase vessel size. However, a larger vessel is more expensive and consumes more fuel. Thus, another way to handle the increase in the streamers' number and length is to design a new front-end gear that produces less drag. Such a novel front-end gear is discussed next and it replaces part of traditional lead-ins, which are heavy and located underwater, with ropes that are lighter and partially above water. Thus, overall drag on the front-end gear is reduced as discussed next.

Figure 3:
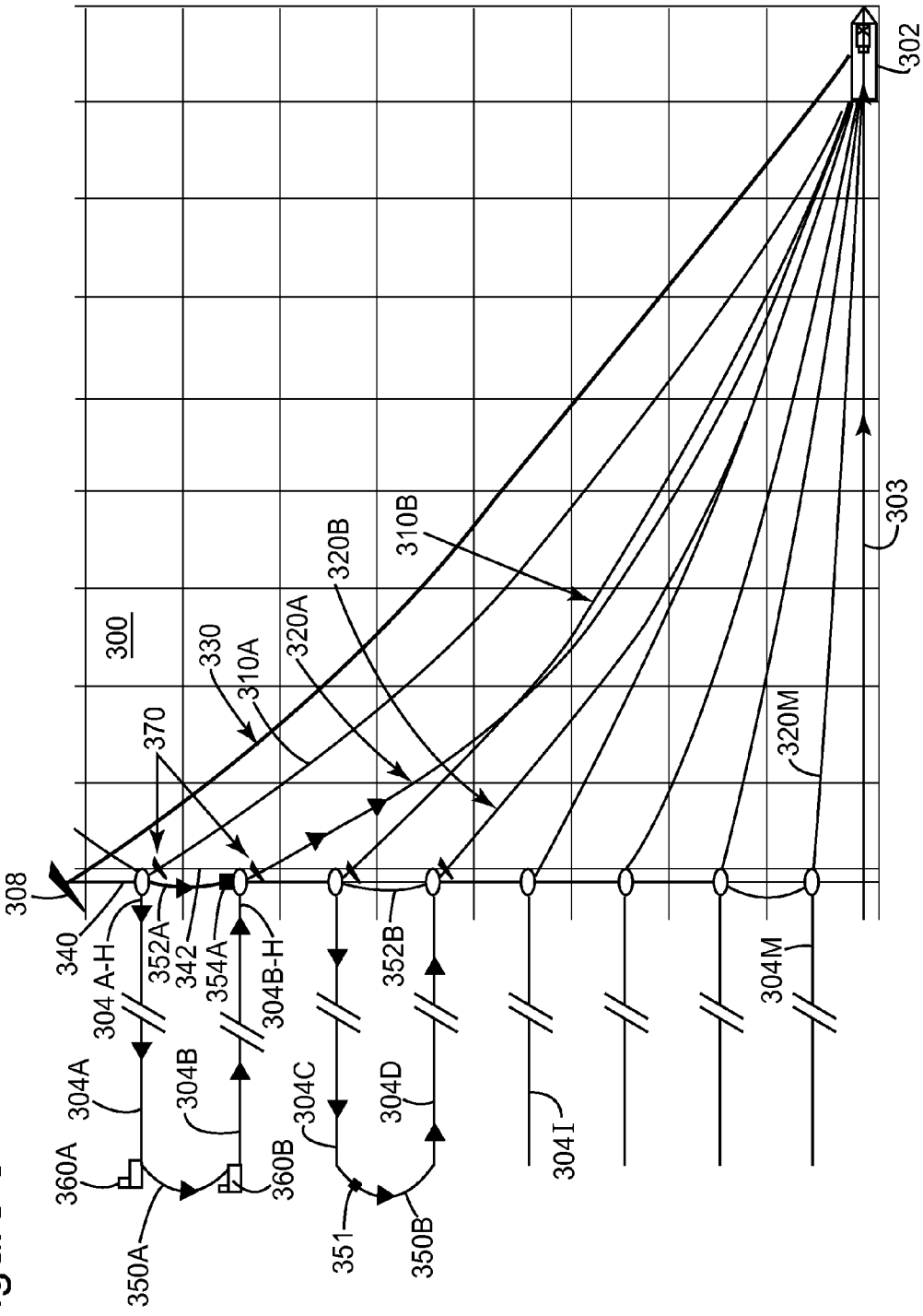
FIG. 3 is a schematic diagram of a front-end gear in which one or more lead-ins are replaced with ropes according to an exemplary embodiment.
Figure 4:
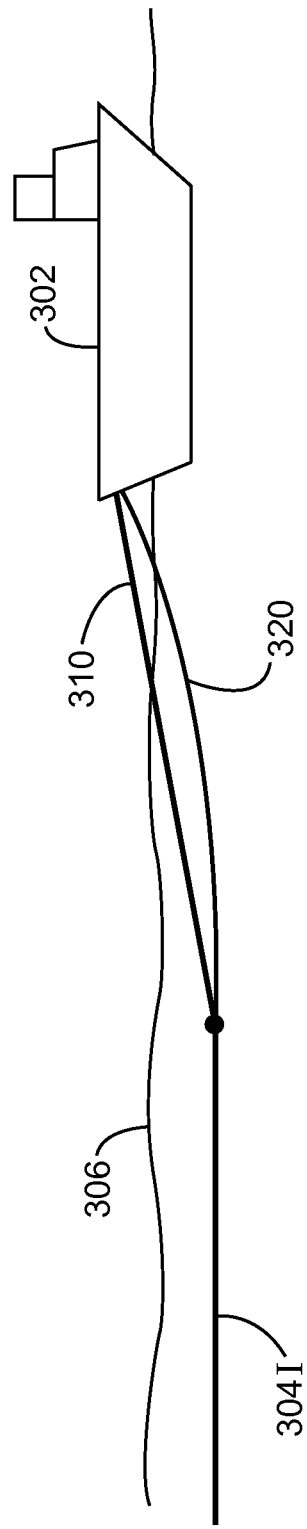
FIG. 4 is a side view of a front-end gear according to another exemplary embodiment.

According to an exemplary embodiment illustrated in FIG. 3, there is a front-end gear 300 that has some lead-ins replaced by ropes to lessen the weight and drag of gear 300. Advantageously, the light-weight ropes are partially above water when in use, reducing drag even further. Front-end gear 300 is shown in FIG. 3 (top view) connecting the vessel 302 to plural streamers 3041. FIG. 4 shows a side view of front-end gear 300 and illustrates how the rope 310 extends partially above water 306 much more than the lead-in 320, due to its light weight.

Returning to FIG. 3, half of the front-end gear 300 is shown having a paravane 308 that connects with a spur line 340 to the head 304A-H of a first streamer 304A. The paravane 308 is also connected to the vessel 302 through a wide-tow rope 330. The head 304A-H is connected with a separation rope 342 to the head 304B-H of the adjacent streamer 304B, and so on. The head 304A-H of the streamer 304A (the streamer closest to the paravane, which is called herein the first streamer), instead of being connected to a traditional lead-in, is connected to a rope 310A.

A discussion of the differences between a rope and a lead-in is now believed to be in order. Traditionally, a lead-in is a strength member (e.g., a metallic cable) that connects the head of a streamer to the towing vessel. The lead-in also provides electric power and data transmission capabilities. These capabilities may be built in to the lead-in, or additional cables may be attached to the lead-in to provide them. On the contrary, a rope is considered to be made of a non-metallic material and is not able to provide electric power and data transmission capabilities. However, a rope may include metallic material. Thus, the term "rope" is used herein generically to indicate that no electric power and data capabilities are provided, just strength. Further, the term "lead-in" is used herein to indicate that in addition to strength, electric power and data transmission capabilities are also provided.

Figure 1:
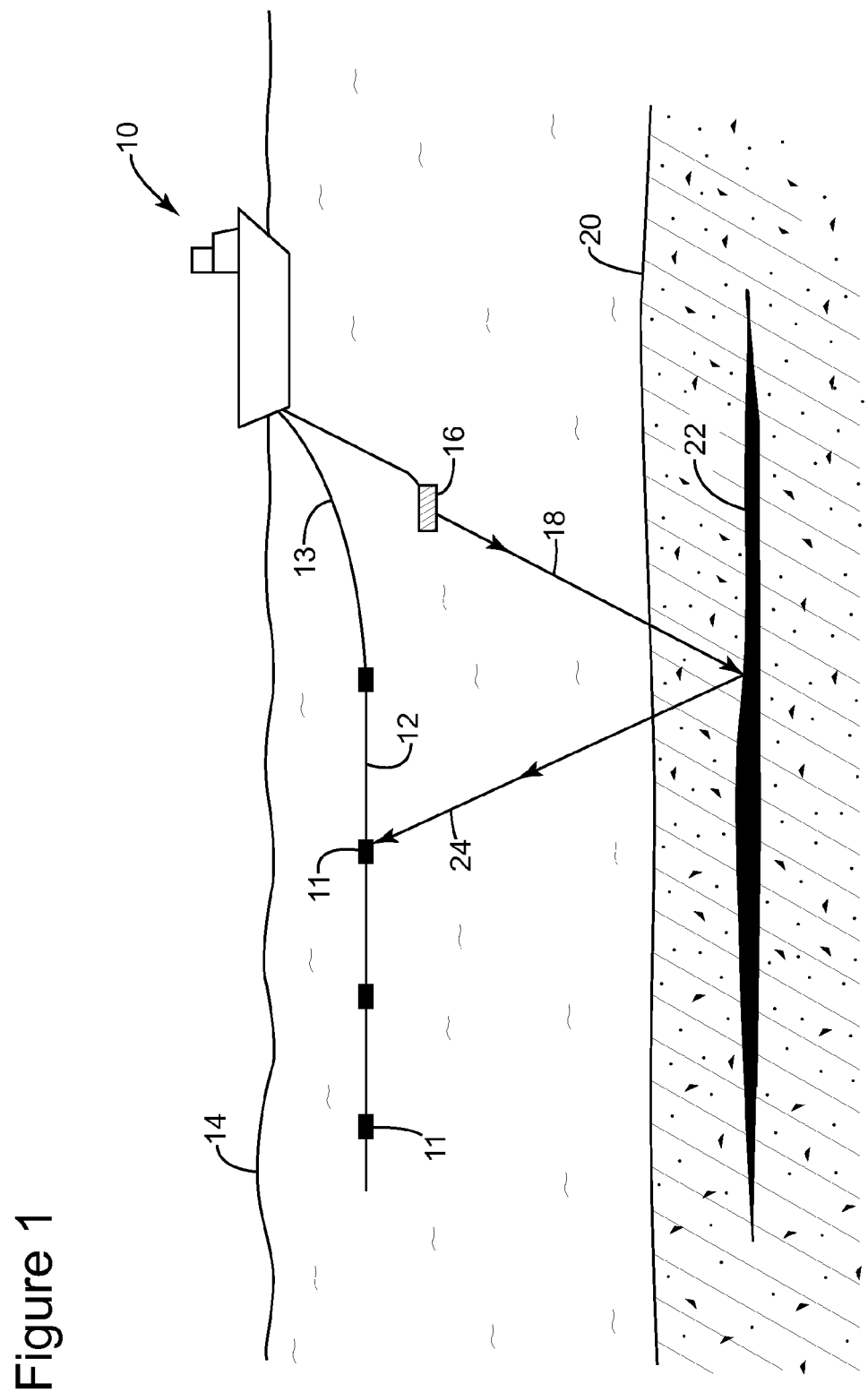
FIG. 1 is a schematic diagram of a conventional marine seismic survey system.
Figure 2:
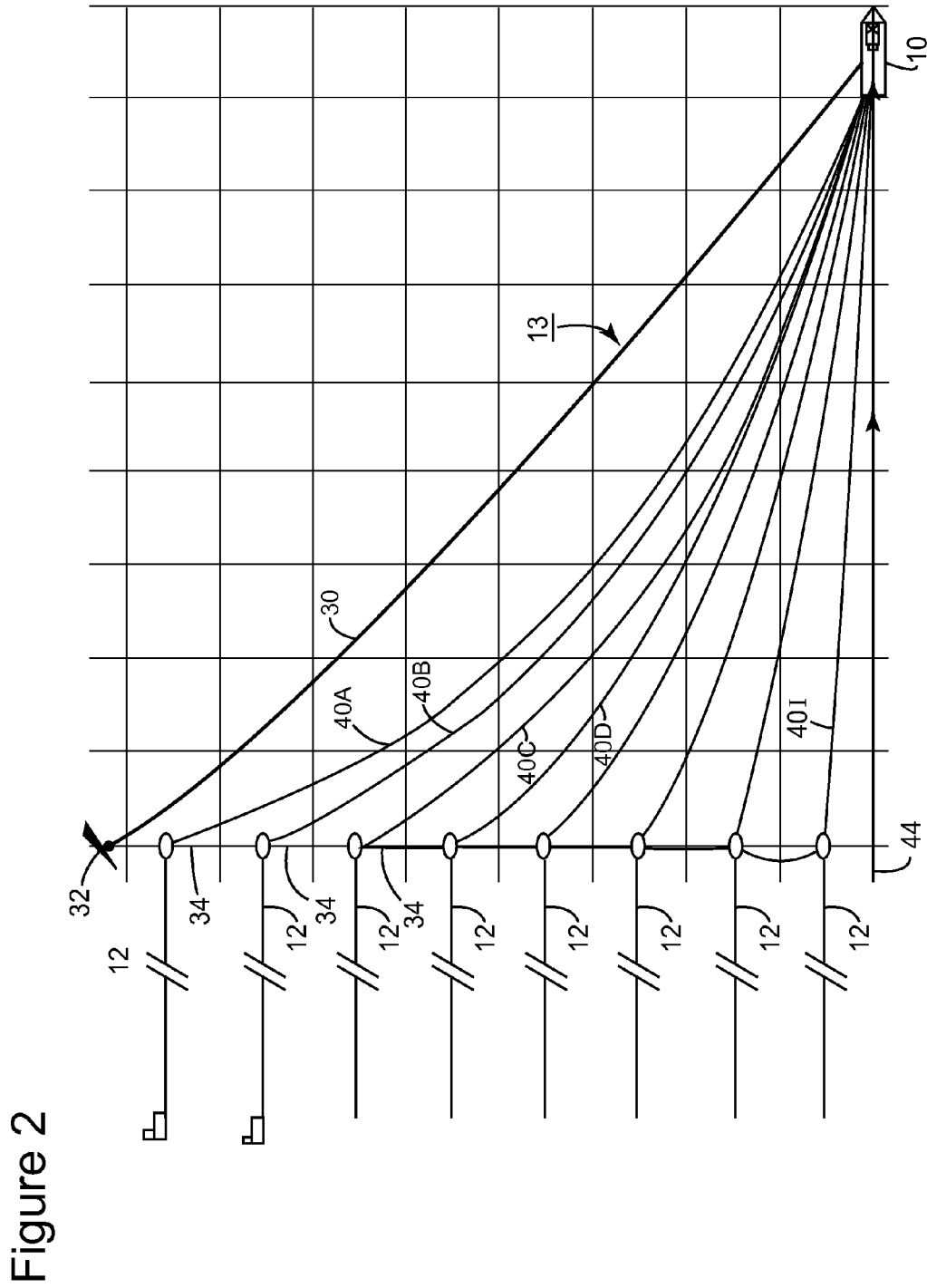
FIG. 2 is a top view of a front-end gear.

Returning to the connection of the streamers to the vessel, note that the second streamer 304B is attached to the vessel 302 with a lead-in 320A, the third streamer 304C is attached to the vessel 302 with a rope 3108, and the fourth streamer 304D is attached to the vessel 302 with a lead-in 320B. Thus, comparing the configuration of the front-end gear 300 of FIG. 3 with the traditional configuration illustrated in FIG. 2, two lead-ins are replaced by ropes 310A and 3108. One or more lead-ins may be replaced by ropes, depending on the total number of streamers. In this respect, note that for a streamer 304M close to the traveling direction 303 of the vessel, there is less incentive to replace its lead-in with rope because the existing lead-in 320M has low drag due to the small angle made with the traveling direction. In other words, it is better to replace the lead-ins closer to paravane 308 than those closer to the vessel's traveling direction.

Thus, a first sub-set of the streamers are connected to the vessel by ropes, and a second sub-set of the streamers are connected to the vessel by lead-ins. The streamers of the first sub-set may be interspersed with the streamers of the second sub-set as shown in FIG. 3.

Figure 5:
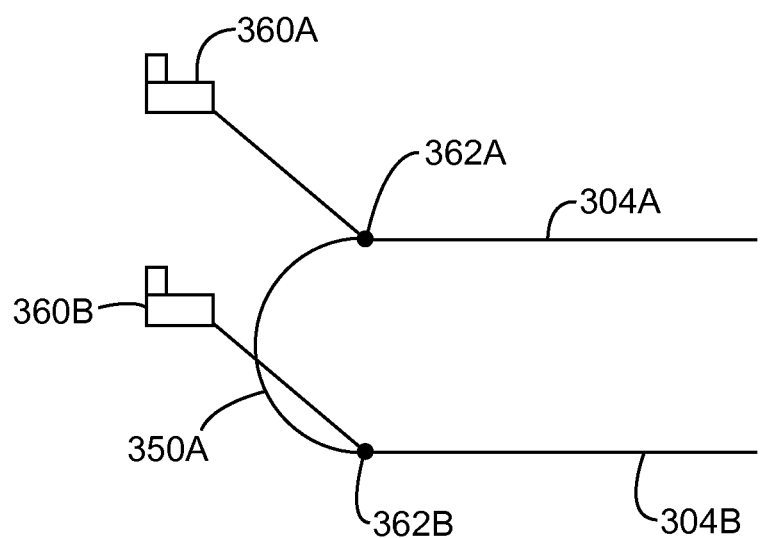
FIG. 5 is a schematic diagram illustrating how a back loop cable is connected between tails of a pair of streamers according to an exemplary embodiment.

However, because the ropes do not provide electric power and data transmission capabilities to the streamers, appropriate back loop cables 350A and 350B are connected between adjacent streamers to offer these capabilities to those streamers connected to ropes. One or more fairings 351 may be attached to the back loop cables. The back loop cable 350A is connected between the tails of streamers 304A and 304B. Note that FIG. 3 shows the tail buoys 360A and 360B of streamers 304A and 304B, respectively, but the back loop cable 350A is connected not to the tail buoys, but to the tails of the streamers as illustrated in FIG. 5. Connections 362A and 362B are shown in FIG. 5 to connect the back loop cable 350A between the tails of streamers 304A and 304B and also to tail buoys 360A and 360B. In this way, seismic data from the streamer 304A, which cannot be transmitted to the vessel 302 along rope 310A, is now rerouted toward the tail of the streamer, connection 362A, back loop cable 350A, connection 362B, streamer 304B, and lead-in 320A to be delivered to the vessel 302 as indicated by the arrows in FIG. 3. The same is true for streamers 304C and 304D, which are connected to each other by back loop cable 350B because the rope 310B does not transmit electric power and/or data. In terms of electric power, any power used by streamer 304A is provided through streamer 304B and back loop cable 350A from the vessel 302.

In an exemplary embodiment, a redundancy loop 352A may be placed between streamers 304A and 304B as illustrated in FIG. 3, i.e., between the heads 304A-H and 304B-H of these streamers. The redundancy loop 352A is optional. However, if present, a control device 354A may be placed between it and the head 304B-H or 304A-H to control when to electrically close or open the redundancy loop 352A. In other words, the control device 354A may be configured to maintain the redundancy loop 352A open while the back loop cable 350A is functional, and to close the redundancy loop 352A (i.e., to make it active) when the functionality of the back loop cable 350A is lost. This control may be implemented in the control device 354A, i.e., it is automatic, or it may be implemented on the vessel. If implemented on the vessel, the control may be automatic or manual. Thus, electric power is provided to all the streamers even when the streamers are retrieved or deployed for the survey. A small deflector 370 may be provided along the lead-ins, ropes, separation ropes, spur line, etc., to increase a total lift force that separates the streamers.

Figure 6:
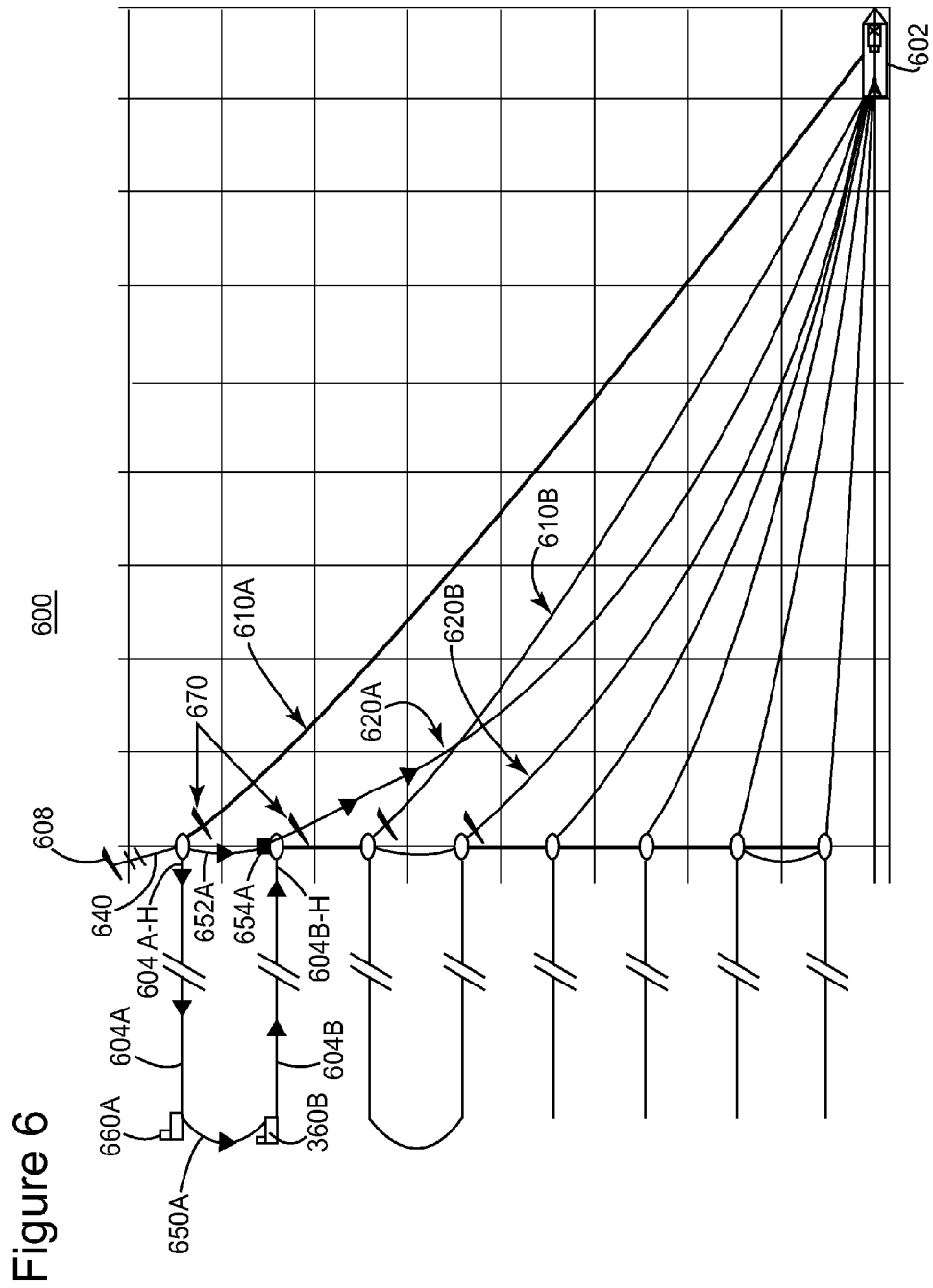
FIG. 6 is a schematic diagram of another front-end gear in which one or more lead-ins are replaced with ropes according to an exemplary embodiment.

According to another exemplary embodiment illustrated in FIG. 6, a front-end gear 600 has the wide-tow rope removed and the rope 610A, which is connected to the head 604A-H of streamer 604, is used for (indirectly) connecting paravane 608 to vessel 602. Thus, paravane 608 is connected only with spur line 640 to the head 604A-H of the streamer 604A. In other words, the wide-tow rope 630 is replaced by rope 610A. All the other elements shown in FIG. 6 may be identical to those shown in FIG. 3 and, for this reason, they are not discussed herein.

Variations of the embodiments illustrated in the figures are also contemplated. For example, the embodiments discussed above describe replacing the lead-in for the streamer farthest from the traveling direction with a rope. In an exemplary embodiment, it is possible to do this for an adjacent streamer, e.g., streamer 304B and not streamer 304A. In other words, it is possible to have a lead-in connecting streamer 304A to the vessel and a rope connecting streamer 304B to the vessel. Further, it is possible to let both streamers 304A and 304B have lead-ins and replace the lead-in of another streamer with a rope. In other words, the number of streamers connected to corresponding ropes and the number of streamers connected to corresponding lead-ins can take any values.

The front-end gears of the above-noted exemplary embodiments may be driven according to multiple methods. One method is discussed next, but this method is exemplary and not intended to limit the invention.

According to an exemplary embodiment illustrated in FIG. 7, there is a method for towing plural streamers during a marine seismic acquisition survey. The method includes a step 700 of connecting a front-end gear between a set of streamers and a towing vessel, the front-end gear including ropes for connecting a first sub-set of streamers to the vessel, and lead-ins for connecting a second sub-set of streamers to the vessel; a step 702 of electrically connecting a back loop cable between tails of first and second adjacent streamers; and a step 704 of towing the streamers underwater with the front-end gear. The first streamer belongs to the first sub-set of streamers and the second streamer belongs to the second sub-set of streamers, and streamers of the first sub-set are interspersed with streamers of the second sub-set.

One or more of the exemplary embodiments discussed above provide a front-end gear for towing streamers with reduced drag by a vessel. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A front-end gear for connecting a set of streamers to a towing vessel, the front-end gear comprising:
ropes for connecting a first sub-set of streamers to the vessel;
lead-ins for connecting a second sub-set of streamers to the vessel; and
a back loop cable electrically connected between tails of first and second adjacent streamers,
wherein the first streamer belongs to the first sub-set of streamers and the second streamer belongs to the second sub-set of streamers.

2. The gear of claim 1, wherein a lead-in is a cable that offer electric power and data transmission capabilities while a rope does not offer these capabilities.

3. The gear of claim 1, further comprising:
a paravane;
a wide tow rope directly connecting the paravane to the vessel; and
a spur line directly connecting the paravane to a head of the first streamer,
wherein the paravane applies a tension to separation ropes connecting heads of the streamers to maintain a distance between the streamers.

4. The gear of claim 1, wherein seismic data collected by receivers of the first streamer is directed through the back loop cable to the second streamer and then to a lead-in of the second streamer to arrive at the vessel.

5. The gear of claim 1, wherein electric power from the vessel is routed to the first streamer through a lead-in of the second streamer, the second streamer and the back loop cable.

6. The gear of claim 1, further comprising:
a redundancy loop cable located between heads of the first and second streamer.

7. The gear of claim 6, further comprising:
a control device located along the redundancy loop cable and configured to maintain it open as long as the back loop cable is closed.

8. The gear of claim 1, wherein the first streamer is farthest away, along a cross-line direction, from a traveling direction of the vessel and the cross-line direction is substantially perpendicular to the traveling direction, and
wherein streamers of the first sub-set are interspersed with streamers of the second sub-set.

9. The gear of claim 1, wherein a rope is lighter than a lead-in and the rope has a larger portion above water than a lead-in when both the rope and lead-in are used to tow the streamers.

10. The gear of claim 1, further comprising:
first and second tail buoys connected to the tails of the first and second streamers.

11. The gear of claim 1, further comprising:
a paravane;
a wide tow rope directly connected to the first streamer and to the vessel; and
a spur line connecting the paravane to a head of the first streamer,
wherein the paravane applies a tension to separation ropes connecting heads of the streamers to maintain a distance between the streamers.

12. A seismic survey system for acquiring seismic data, the system comprising:
a towing vessel;

a front-end gear connected to the vessel; and plural streamers connected to the front-end gear and configured to collect the seismic data, wherein tails of a pair of streamers are electrically connected to each other with a back loop cable, and wherein the pair of streamers extend substantially in parallel to each other for kilometers and are mechanically connected to each other only at corresponding tail points and corresponding head points.

13. The system of claim 12, wherein the front-end gear comprises:

ropes for connecting a first sub-set of streamers to the vessel; and lead-ins for connecting a second sub-set of streamers to the vessel, wherein the pair of streamers includes a first streamer that belongs to the first sub-set of streamers and a second streamer that belongs to the second sub-set of streamers, and wherein streamers of the first sub-set are interspersed with streamers of the second sub-set.

14. The gear of claim 13, wherein a lead-in is a cable that offer electric power and data transmission capabilities while a rope does not offer these capabilities.

15. The gear of claim 13, wherein seismic data collected by receivers of the first streamer is directed through the back loop cable to the second streamer and then to a lead-in of the second streamer to arrive at the vessel.

16. The gear of claim 13, wherein electric power from the vessel is routed to the first streamer through a lead-in of the second streamer, the second streamer and the back loop cable.

17. The gear of claim 13, further comprising:

a redundancy loop cable located between heads of the first and second streamer.

18. The gear of claim 17, further comprising:

a control device located along the redundancy loop cable and configured to maintain it open as long as the back loop cable is closed.

19. A method for towing plural streamers during a marine seismic acquisition survey, the method comprising:

connecting a front-end gear between a set of streamers and a towing vessel, the front-end gear including ropes for connecting a first sub-set of streamers to the vessel and lead-ins for connecting a second sub-set of streamers to the vessel;

electrically connecting a back loop cable between tails of first and second adjacent streamers; and towing the streamers under water with the front-end gear, wherein the first streamer belongs to the first sub-set of streamers and the second streamer belongs to the second sub-set of streamers, and wherein streamers of the first sub-set are interspersed with streamers of the second sub-set.

20. The gear of claim 1, wherein a lead-in is a cable that offers electric power and data transmission capabilities while a rope does not offer these capabilities.

* * * * *

UNITED STATES PATENT AND TRADEMARK OFFICE
CERTIFICATE OF CORRECTION

PATENT NO. : 9,019,796 B2  
APPLICATION NO. : 13/976765  
DATED : April 28, 2015  
INVENTOR(S) : Guevel et al.

Page 1 of 1

It is certified that error appears in the above-identified patent and that said Letters Patent is hereby corrected as shown below:

In the specification

In Column 1, Line 55, delete "401" and insert -- 40I --, therefor.

In Column 1, Line 66, delete "401," and insert -- 40I, --, therefor.

In Column 3, Line 43, delete "3041." and insert -- 304I. --, therefor.

In Column 4, Line 8, delete "3108," and insert -- 310B, --, therefor.

In Column 4, Line 12, delete "3108." and insert -- 310B. --, therefor.

Signed and Sealed this  
Twelfth Day of July, 2016

Michelle K. Lee  
*Director of the United States Patent and Trademark Office*